United States Patent Office.

W. W. JACOBS, OF HAGERSTOWN, MARYLAND.

Letters Patent No. 63,054, dated March 19, 1867.

IMPROVED BURNING-FLUID.

The Schedule referred to in these Letters Patent and making part of the same.

TO ALL WHOM IT MAY CONCERN:

Be it known that I, W. W. JACOBS, of Hagerstown, Washington county, Maryland, have invented a new and improved Burning Fluid; and I do hereby declare that the following is a full, clear, and exact description thereof, which will enable others skilled in the art to make and use the same.

This burning fluid is composed of the following ingredients, mixed together in and about the proportions stated, viz: forty gallons of gasoline or naphtha, one pound of pine gum, (pulverized,) one-half pound bark of sassafras root, (ground,) one-fourth pound gamboge, (pulverized,) one-half pound galbanum.

The pine gum has a tendency to impart body to the fluid, retard evaporation, and to add to the durability while burning. The bark of sassafras root tends also to give body to the fluid, retarding also its evaporation, and causing it to emit a light and pleasant odor while burning, thus assisting to destroy the offensive smell accompanied by the burning of most oils. The gamboge increases the burning qualities of the fluid, giving body and durability to the fluid, and retarding its evaporation. The galbanum has a tendency to give body and durability to the fluid, while adding to the brilliancy and steadiness of the burning flame.

I claim as new, and desire to secure by Letters Patent—

A fluid composed of the ingredients hereinabove named, mixed together in and about the proportions described, and for the purpose specified.

The above specification of my invention signed by me this 4th day of January, 1867.

W. W. JACOBS.

Witnesses:
    FRANK W. TRACY,
    J. C. PLANCK.